United States Patent
Ball

(10) Patent No.: US 6,425,591 B1
(45) Date of Patent: Jul. 30, 2002

(54) MODULAR CART

(76) Inventor: Richard Ball, 7909 Petaca Trail, Austin, TX (US) 78729

( * ) Notice: Subject to any disclaimer, the term of this patent is extended or adjusted under 35 U.S.C. 154(b) by 0 days.

(21) Appl. No.: 09/636,438

(22) Filed: Aug. 11, 2000

(51) Int. Cl.⁷ .................................................. B62B 3/02
(52) U.S. Cl. ..................... 280/79.11; 280/79.3; 280/39; 280/47.11; 280/47.19; 280/47.315; 280/47.35; 280/638
(58) Field of Search ............................ 280/79.11, 79.3, 280/87.01, 33.997, 38, 39, 47.11, 47.17, 47.19, 47.23, 47.24, 47.315, 47.33, 47.34, 47.35, 47.371, 638, 656, 87.021; 211/182, 191; 180/906

(56) References Cited

U.S. PATENT DOCUMENTS

| | | | |
|---|---|---|---|
| 536,485 A | * 3/1895 | Smith | |
| 863,846 A | * 8/1907 | Hasse | |
| 2,191,184 A | * 2/1940 | Voorheis | 280/100 |
| 2,571,750 A | 10/1951 | O'Halloran | |
| 3,751,758 A | * 8/1973 | Higbee et al. | 16/35 |
| 3,782,746 A | * 1/1974 | Isaacs | 280/33.99 |
| 4,545,490 A | * 10/1985 | Hsiao et al. | 211/191 |
| 4,796,909 A | 1/1989 | Kirkendall | |
| 5,005,846 A | 4/1991 | Taylor | |
| 5,028,062 A | 7/1991 | Pinnell et al. | |
| 5,186,479 A | 2/1993 | Flowers | |
| 5,249,823 A | 10/1993 | McCoy et al. | |
| 5,299,826 A | 4/1994 | Flowers | |
| 5,361,569 A | * 11/1994 | Schupman et al. | 56/228 |
| 5,599,031 A | 2/1997 | Hodges | |
| 5,653,458 A | 8/1997 | Chaparian | |
| 5,660,637 A | * 8/1997 | Dodge | 118/500 |
| 5,899,469 A | 5/1999 | Pino | |
| 5,899,482 A | * 5/1999 | Kimura | 280/445 |
| 6,149,170 A | * 11/2000 | Dotson | 280/87.021 |

* cited by examiner

*Primary Examiner*—Brian L. Johnson
*Assistant Examiner*—J. Allen Shriver
(74) *Attorney, Agent, or Firm*—John G. Fischer

(57) ABSTRACT

A modular cart comprises a load carrying frame and a wheeled carriage supporting the load-carrying frame. The carriage includes a front carriage assembly pivotally coupled to a front of the frame and a rear carriage assembly pivotally coupled to a rear of the frame. The front and the rear carriage assemblies are substantially identical. Each carriage assembly comprises an axle pivotally coupled at a vertical midpoint axis to the load-carrying frame. The axle is pivotal about the vertical midpoint axis and is selectable between a first position pivotally fixed with respect to the load carrying frame and a second position freely pivotal about the axis. A caster wheel assembly is attached to each of the ends of the axle. The caster wheel assembly is pivotal about a vertical end axis and is selectable between a third position pivotally fixed with respect to the axle and a fourth position freely pivotal about the vertical end axis.

17 Claims, 6 Drawing Sheets

MODULAR CART

BACKGROUND OF THE INVENTION

The present invention relates to carts in general and, more particularly to carts that are easily modified for differing applications such as indoor use and outdoor use, towable by a mechanized tug or movable by hand.

The wide range of utility carts can be found in various phases and application of business and industry, and even in personal use. However, most carts in use today are limited, in that they are typically configured for a single application, and generally are not designed to support multiple uses or are reconfigurable to adapt the cart to multiple uses. This results in requiring either expensive and time consuming modification to an existing cart or the expense of acquiring a new cart to fill a particular application. When multiple applications are required at a single location, an entire fleet of carts may be required to fill individually specific purposes with the resultant 'clutter' of an excess number of carts hampering the work efficiency of a site.

This is particularly prevalent in the film and video industry, where film sites are small and require frequent moving from site to site. The carts typically used at film sites are usually of a fixed configuration with one mode of steering. However, as film sites move from urban to rural areas a cart with a wider track (width between wheels) may be desired for improved stability, or a narrow track on hard urban surfaces where space is a premium and a narrow track cart is desired. Additionally, the carts are often towed by a mechanized tug or vehicle between sites or within a large site, and then are repositioned by hand at the site. Optimum steering modes differ between individually towed carts, a train of towed carts, or single carts repositioned by hand. Therefore, there is a need in the industry for a cart that is readily reconfigurable for multiple uses and has reconfigurable modes of steering.

SUMMARY OF THE INVENTION

One aspect of the present invention is a modular cart. The cart comprises a load carrying frame and a wheeled carriage supporting the load-carrying frame. The carriage includes a front carriage assembly pivotally coupled to a front of the frame and a rear carriage assembly pivotally coupled to a rear of the frame. The front and the rear carriage assemblies are substantially identical. Each carriage assembly comprises an axle pivotally coupled at a vertical midpoint axis to the load-carrying frame. The axle is pivotal about the vertical midpoint axis and is selectable between a first position pivotally fixed with respect to the load carrying frame and a second position freely pivotal about the axis. A caster wheel assembly is attached to each of the ends of the axle. The caster wheel assembly is pivotal about a vertical end axis and is selectable between a third position pivotally fixed with respect to the axle and a fourth position freely pivotal about the vertical end axis.

Another aspect of the present invention is a modular cart comprising a steerable wheeled carriage comprising at least a front and a rear axle and a plurality of wheel assemblies attached to ends of the axles to support the cart on a surface wherein the wheeled carriage is selectable between at least two modes of steering. A load-carrying frame is supported by the carriage and further comprising a plurality of horizontally and vertically arranged beams. Each beam defines at least two horizontal slots substantially extending along a length of the beam. A plurality of fasteners are partially captured in the beam slots and further engage connector plates to interconnect the plurality of horizontal and vertical beams into a desired framework defining at least one storage area. The beams, the fasteners, and the connector plates are infinitely adjustable along the slots to selectably create different sized storage areas optimized to a desired configuration.

Yet another aspect of the present invention is a modular cart comprising a load-carrying frame further comprising a plurality of horizontally and vertically arranged beams. Each beam defines at least two horizontal slots substantially extending along a length of the beam. A plurality of fasteners are partially captured in the beam slots and further engage connector plates to interconnect the plurality of horizontal and vertical beams into a desired framework defining at least one storage area. The beams, the fasteners, and the connector plates are infinitely adjustable along the slots to selectably create different sized storage areas optimized to a desired configuration. A wheeled carriage supports the load-carrying frame and further comprises a front carriage assembly pivotally coupled to a front of the frame and a rear carriage assembly pivotally coupled to a rear of the frame. The front and the rear carriage assemblies are substantially identical. Each carriage assembly comprises an axle pivotally coupled at a vertical midpoint axis to the load-carrying frame. The axle is pivotal about the vertical midpoint axis and is selectable between a first position pivotally fixed with respect to the load carrying frame and a second position freely pivotal about the axis. A caster wheel assembly is attached to each of the ends of the axle. The caster wheel assembly is pivotal about a vertical end axis and is selectable between a third position pivotally fixed with respect to the axle and a fourth position freely pivotal about the vertical end axis.

These and other features, advantages and objects of the present invention will be further understood and appreciated by those skilled in the art by reference to the following specification, claims and appended drawings.

DETAILED DESCRIPTION OF PREFERRED EMBODIMENT

For purposes of description herein, the terms "upper," "lower," "right," "left," "rear," "front," "vertical,"

Figure 1:
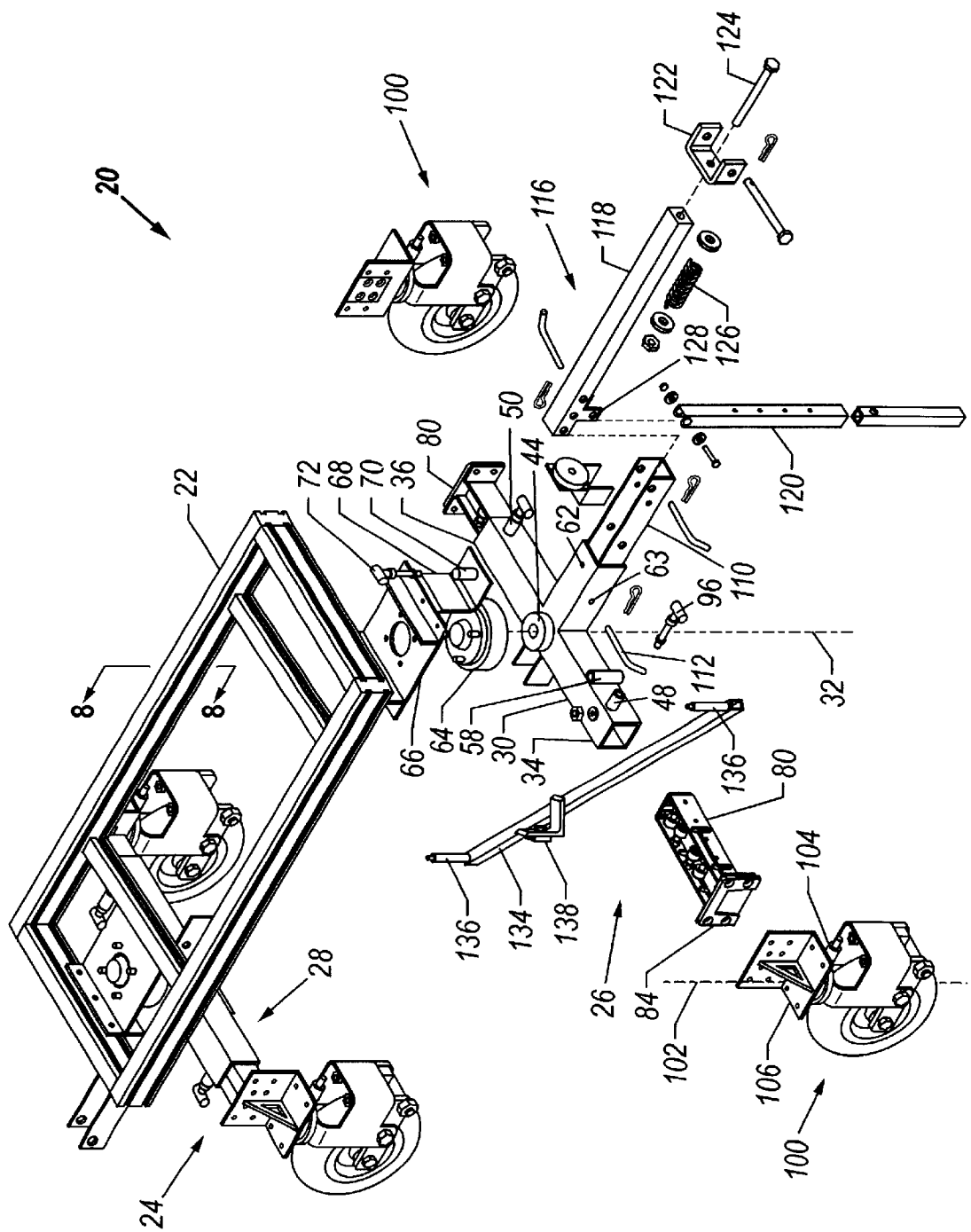
FIG. 1 is a perspective view of a partially exploded modular cart with an upper portion of the load-carrying framework removed for clarity, which is a preferred embodiment of the present invention.

"horizontal," and derivatives thereof shall relate to the invention as oriented in FIG. 1. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A preferred embodiment of a modular cart 20 is shown generally in FIG. 1. Modular cart 20 comprises a load carrying frame 22 supported by a wheeled carriage 24 for transporting items across a ground surface. Wheeled carriage 24 includes a front carriage assembly 26 and a rear carriage assembly 28. Carriage assemblies 26 and 28 are substantially identical and only front carriage assembly 26 is described herein for brevity.

Figure 2:
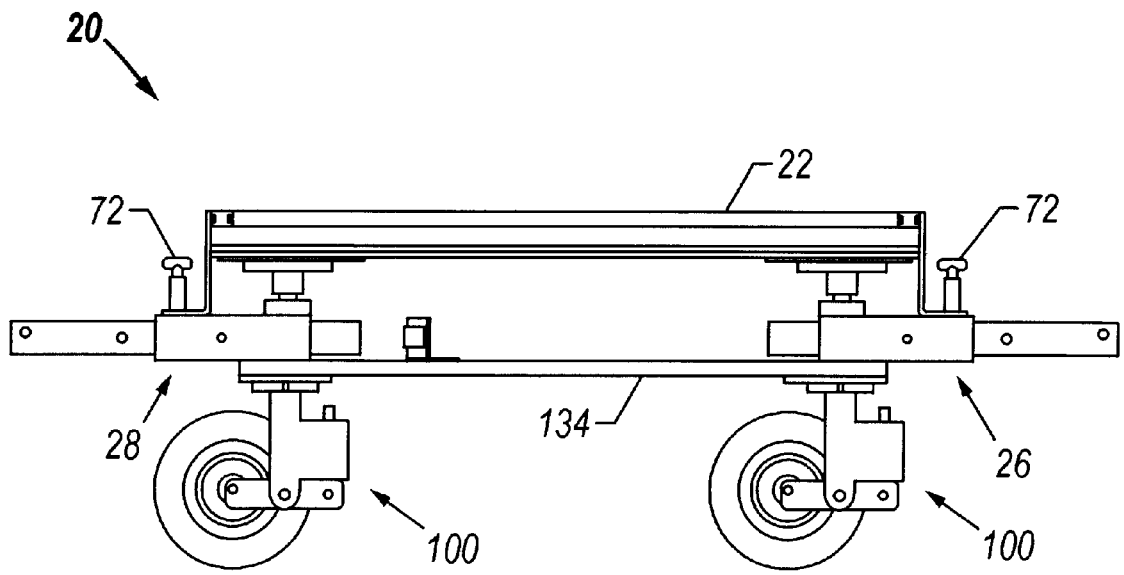
FIG. 2 is a side elevation view of the modular cart of FIG. 1.
Figure 3:
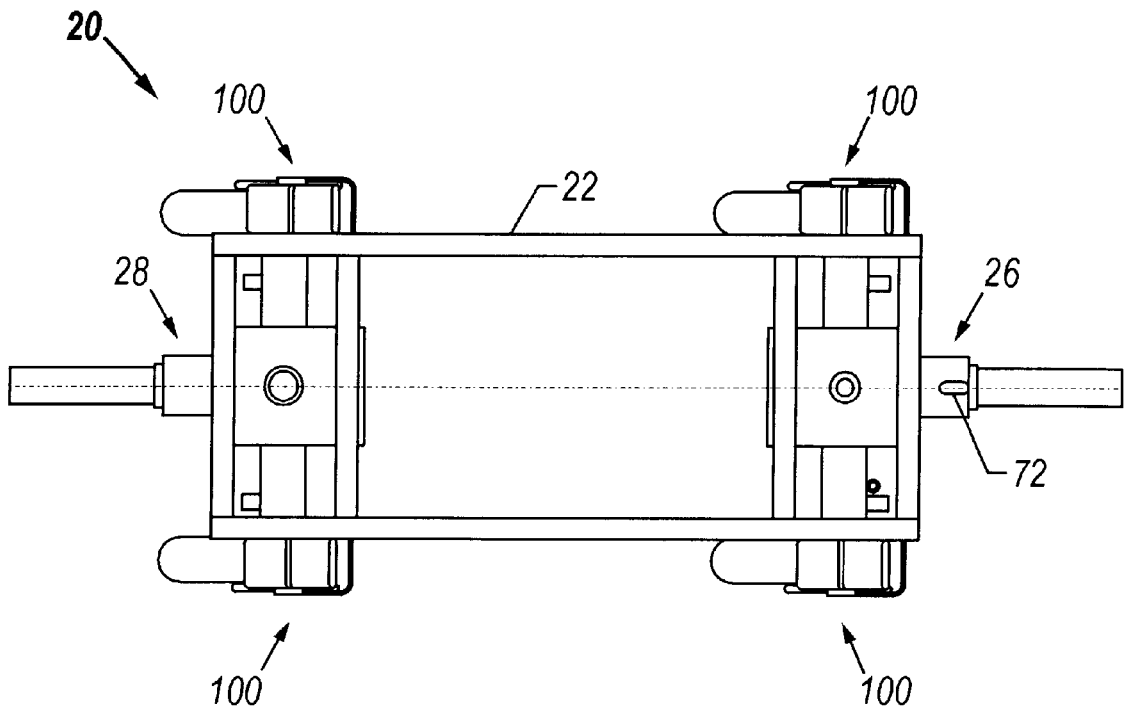
FIG. 3 is a top plan view of the modular cart of FIG. 1.
Figure 4:
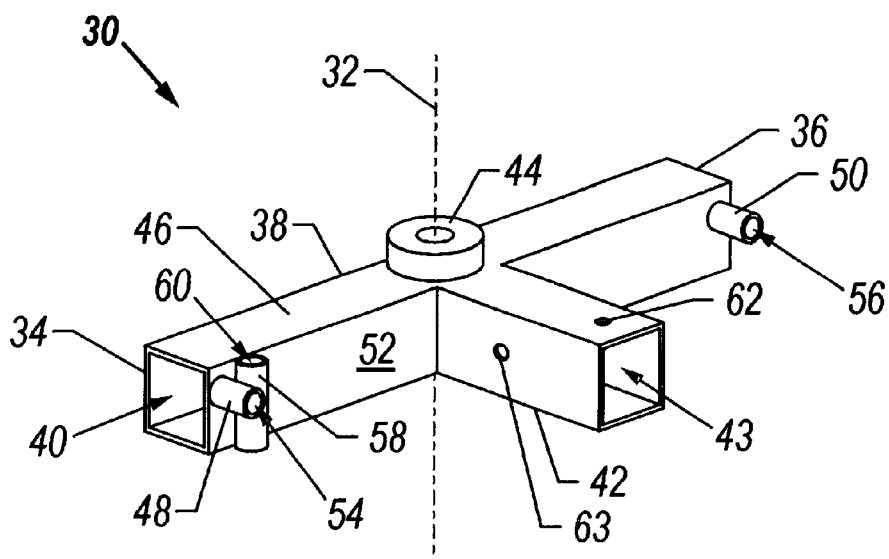
FIG. 4 is a perspective view of an axle.

Turning to FIGS. 1–3, and particularly to FIG. 1 wherein front carriage assembly 26 is illustrated in an exploded manner. Front carriage assembly 26 includes an axle 30 and is more clearly shown in FIG. 4. In the preferred embodiment axle 30 generally takes the shape of a "T" with the cross member of the "T" being longer than the stem. In the preferred embodiment, axle 30 is fabricated from joined square tubular members such that crossbar 38 defines an internal passageway 40 extending from first end 34 to second end 36. Further, stem 42 is also fabricated from a square-tubular stock anddefines a second internal passageway 43. Stem 42 is positioned at a midpoint of crossbar 38 and second internal passageway 43 extends through the far wall of crossbar 38 such that second internal passageway 43 is unobstructed. A collar 44 is mounted to a top surface 46 of crossbar 38. Collar 44 is permanently affixed to top surface 46 and is positioned midway between first and second ends 34 and 36 of crossbar 38. A vertical central axis of collar 44defines a vertical midpoint axis 32 of axle 30 about which axle 30 pivots when front carriage 26 is mounted to load carrying frame 22. A first horizontal sleeve 48 is affixed to a near wall 52 of crossbar 38 and a second horizontal sleeve 50 is affixed to near wall 52 of crossbar 38 proximate to second end 36. Sleeves 48 and 50 further define first and second horizontal apertures 54 and 56. Apertures 54 and 56 extend through near wall 52 to communicate with first internal passageway 40. A vertical sleeve 58 is affixed to near wall 52 proximate to first end 34 of axle 30 anddefines a vertical aperture 60. The function and purpose of apertures 54, 56, and 60 are discussed in greater detail below.

A bearing 64 is attached to collar 44 which in turn is attached to carriage mounting plate 66. Bearing 64 permits the pivoting or rotation of axle 30 with respect to carriage mounting plate 66 about vertical midpoint axis 32. Stem 42 of axle 30 includes a vertical hole 62 therethrough, and carriage mounting plate 66 includes an angled tongue 68 extending from a front portion of carriage mounting plate 66. Angled tongue 68 includes a vertically oriented axle locking sleeve 70 which is vertically aligned with hole 62 in stem 42 of axle 30 when stem 42 is aligned with the longitudinal axis of modular cart 20. An axle locking pin 72 is received by axle locking sleeve 70 and selectively extends into or retracts from hole 62 to selectively lock axle 30 to carriage mounting plate 66 when pin 72 is engaged in hole 62 or to permit pivoting of axle 30 about axis 32 with respect to carriage mounting plate 66 when pin 72 is removed from hole 62.

Figure 5:
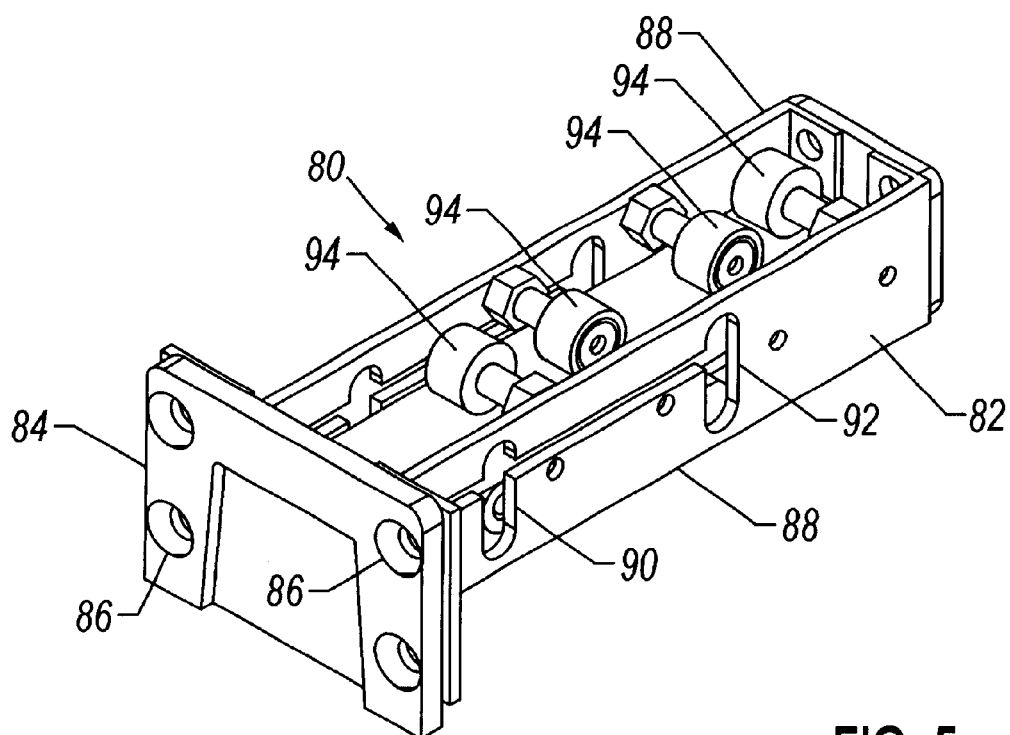
FIG. 5 is a perspective view of an extendable axle arm.

Turning now to FIG. 5 an extendable axle arm 80 includes a frame 82 having a height and width marginally smaller in cross-section than the cross-section of passageway 40 through crossbar member 38 of axle 30. Frame 82 has a castered wheel assembly mount plate 84 affixed to one end wherein mount plate 84 includes a plurality of holes 86 therethrough to facilitate the attachment and mounting of a castered wheel assembly 100. Frame 82 furtherdefines in sides 88 first and second apertures 90 and 92 respectively. A plurality of rollers 94 are affixed to sides 88 of frame 82. Rollers 94 are oriented such that they rotate about a horizontal axis which is substantially perpendicular to sides 88. In this manner, rollers 94 can act as bearings when extendable axle arm 80 is translated along its longitudinal axis within crossbar 38. The outer tangent points of rollers 94 lie marginally outside the cross-sectional area both upper and lower of frame 88 for contacting the upper and lower internal surfaces of crossbar 38.

Turning again to FIG. 1, extendable axle arm 80 is sleeved within both first end 34 and second end 36 of axle 30. An extension lock pin 96 is received in each of first and second horizontal sleeves 48 and 50 of axle 30 and selectively engage first and second apertures 90 and 92 in extendable axle arm 80. When extension lock pin 96 engages first aperture 90, extendable axle arm 80 is in its retracted position, and when extension lock pin engages second aperture 92, extendable axle arm 80 is in its extended position.

A castered wheel assembly 100 is any one of a number of well known trailing wheel-type casters that are readily commercially available. Castered wheel assembly 100 pivots about a vertical end axis 102. Caster 100 is journaled to pivot about vertical end axis 102 in a manner such that vertical end axis 102 is offset from the center of the caster wheel. Castered wheel assembly 100 further includes lockpin 104 such that disengagement of lockpin 104 permits the caster to freely pivot about vertical end axis 102. Conversely, engagement of lockpin 104 locks the caster in a position such that the general vertical plane of the caster wheel is perpendicular to cross-bar 34 of axle 30. Castered wheel assembly 100 further includes mount angle 106 to facilitate attachment of castered wheel assembly 100 to castered wheel assembly mount plate 84 of extendable axle arm 80.

Figure 6:
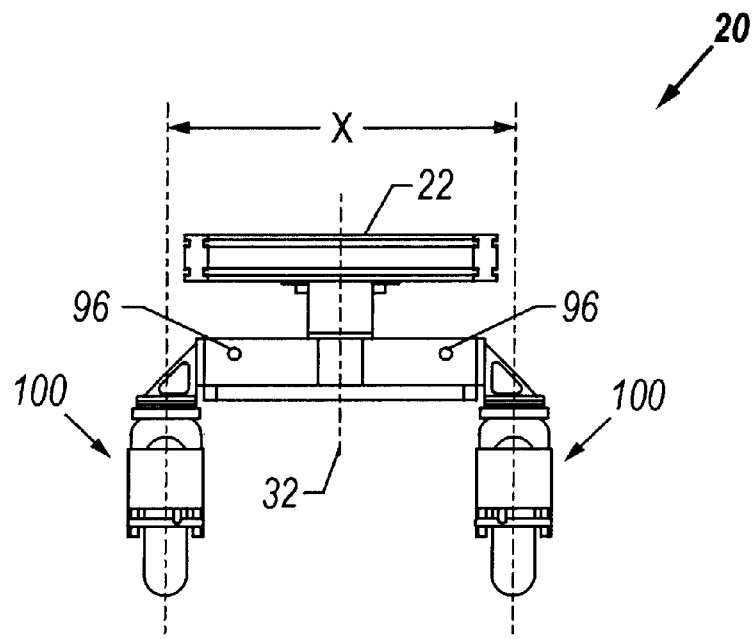
FIG. 6 is a front elevation view of the modular cart with the extendable axle arms retracted defining a narrow wheel track.
Figure 7:
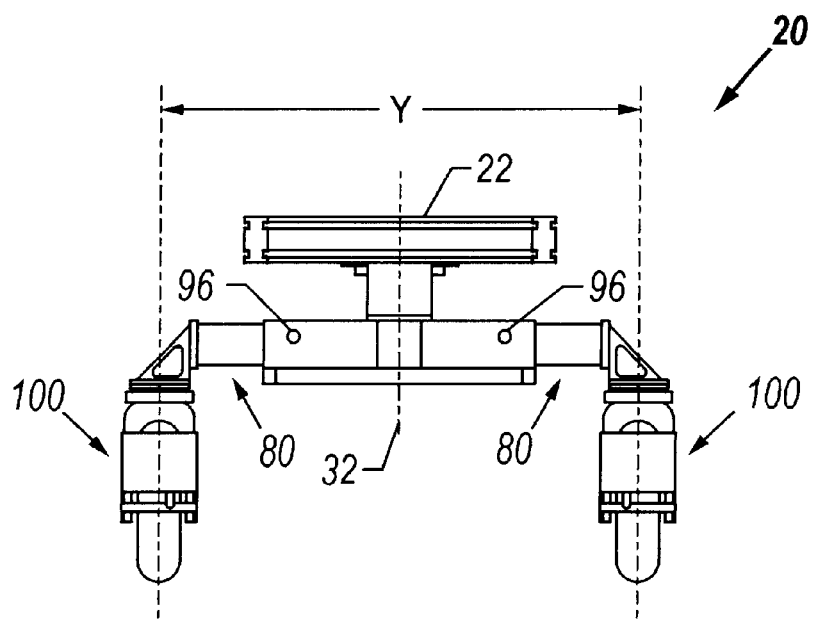
FIG. 7 is a front elevation view of the modular cart with the extendable axle arms extended defining a wide wheel track.

Thus, when extendable axle arm 80 is translated within passageway 40 between its extended and retracted positions, the track width between laterally opposite castered wheel assemblies 100 are correspondingly widened and narrowed. FIGS. 6 and 7, illustrate in end elevation the different track widths of modular cart 20. FIG. 6 shows modular cart 20 with extendable axle arms 80 in their retracted position and castered wheel assemblies 100 laterally displaced defing a track width of dimension X. FIG. 7 shows modular cart 20 wherein extendable axle arms 80 are in their extended position thereby displacing castered wheel assemblies 100 farther apart to define a wider track width of dimension Y. Narrow track width X is useful when modular cart 20 is used in crowded areas where space is at a premium. However, in those instances where the load carried by modular cart 20 could be top heavy or on rough terrain a wider track width for modular cart 20 provides additional stability and is highly desirable. The adjustability of the track width allows the same modular cart can be used in both configurations by making a simple adjustment to extend extendable axle arms 80.

An extendable tongue 110 is received in second internal passageway 43 of stem 42 of axle 30. Extendable tonguel 10 is shown as a U-shaped channel beam, but can take any cross-sectional shape that can be telescopically received in stem 43 of axle 30. Extendable tongue 110 can be fixed in different extension positions by pin 112 being inserted in horizontal hole 63 of stem 43 and engaging one of like positioned holes along extendable tongue 110 to permit extendable tongue 10 to be affixed in a desired position.

As further shown in FIG. 1, a handle assembly 116 is pivotally coupled to extendable tongue 110 at a forward end thereof such that handle assembly 116 can be pivoted between a vertical stored position and a horizontal in-use position for pulling and steering modular cart 20. Handel assembly 116 comprises handle 118 with a hitch attachment 122 at an end opposite from tongue 110. Hitch attachment 122 is attached with a bolt 124 and damping spring 126 such that a rapid or sudden pulling on hitch attachment 122 results in compression of damping spring 126 to minimize any jarring to modular cart 20. A jack support member 120 is pivotally attached to handle 118 and is pivotal between a stowed position parallel with handle 118 and an extended position as shown in FIG. 1 substantially depending from handle 118 in a vertical manner. Jack support member 120 can be length adjustable such that the distal end of jack support member from its pivot point can contact the ground surface upon which the modular cart stands. A downward pressure at the hitch attachment end of handle 118 will cause handle 118 to pivot about jack attachment 128, thus providing an upward force to axle 30. In this manner, a downward pressure at hitch attachment 122 can relieve much of the weight supported by castered wheel assemblies 100 so that extendable axle arms 80 can be more easily extended or retracted at the desire of the user.

Rear carriage assembly 28 is substantially identical to front carriage assembly 26, and those skilled in the art will readily recognize that modular cart 20 can therefore be operated in any number of steering modes. The selective engagement or disengagement of locking pins 104 permit wheeled casters 100 of front carriage assembly 26 to be freely pivoting with the casters of rear carriage assembly 28 in a fixed position or vice versa, or even all four castered wheel assemblies 100 can be configured in their freely pivotal state.

Alternately, castered wheel assemblies 100 can be locked in their trailing positions substantially perpendicular to crossbar 38 of axle 30 with axle 30 freely pivotal about carriage mount plate 66 of front carriage assembly 26. Rear carriage assembly 28 can be either pivotally fixed with respect to its carriage plate 66 or can also be disengaged from its carriage mounting plate 66 so that both front and rear carriage assemblies 26 and 28 are pivotal about their respective vertical midpoint axes 32.

When both front and rear carriage assemblies 26 and 28 are disengaged to be pivotal about their respective axes 32, a stabilizer bar 134 is utilized to interconnect the respective axles of each to facilitate maintaining directional control when moving modular cart 20. Stabilizer bar 134 includes an upstanding shaft 136 at each end thereof and generally extends from a one of two front corners of modular cart 20 to an opposite rear corner of modular cart 20. In the preferred embodiment, stabilizer bar 134 extends from the right front corner to the rear left corner of the cart. Each upstanding shaft 136 is received in the corresponding vertical sleeve 58 attached to the near wall of axle 30. The diameter of shaft 136 is such that each shaft 136 is freely rotatable within vertical aperture 60 of vertical sleeve 58. When front and rear carriage assemblies are interconnected in such a manner with stabilizer bar 134, a clockwise rotation of the front axle about its vertical midpoint axis 32 causes an opposite counterclockwise rotation of the rear axle about its vertical midpoint axis 32. The opposite rotation or pivoting of the front and rear carriage assemblies facilitates modular cart 20 in making a true turn and one in which the respective castered wheels follow an identical track. This is particularly advantageous when a number of modular carts 20 are connected in a train-like fashion thereby preventing the last car in the train from trailing off a desired track to possibly hit an obstruction which is being maneuvered around. A stop 138 can be affixed to an intermediate point of stabilizer bar 134 to limit the pivoting of axles 30 thereby preventing the respective front and rear caster asssemblies from striking each other when modular cart 20 is placed in a tight or short turning radius.

Figure 8:
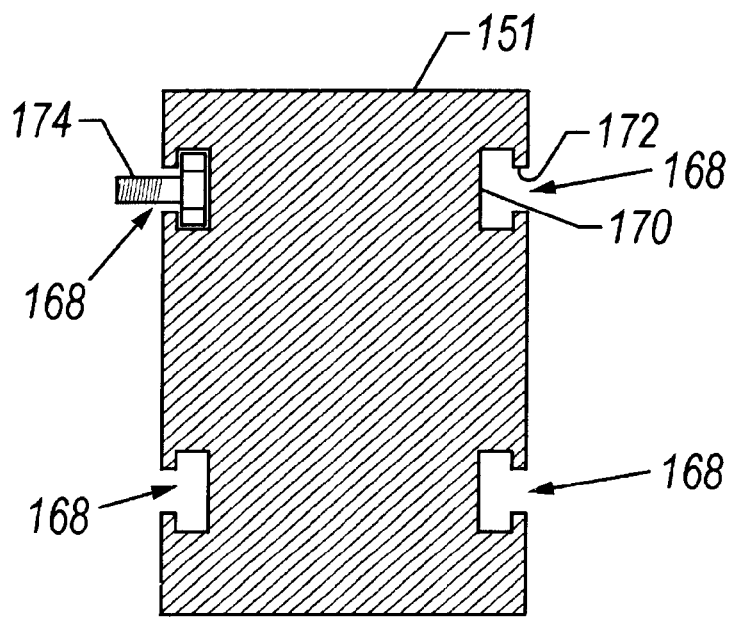
FIG. 8 is a cross sectional view of a frame beam taken along the line VIII—VIII of FIG. 1.
Figure 10:
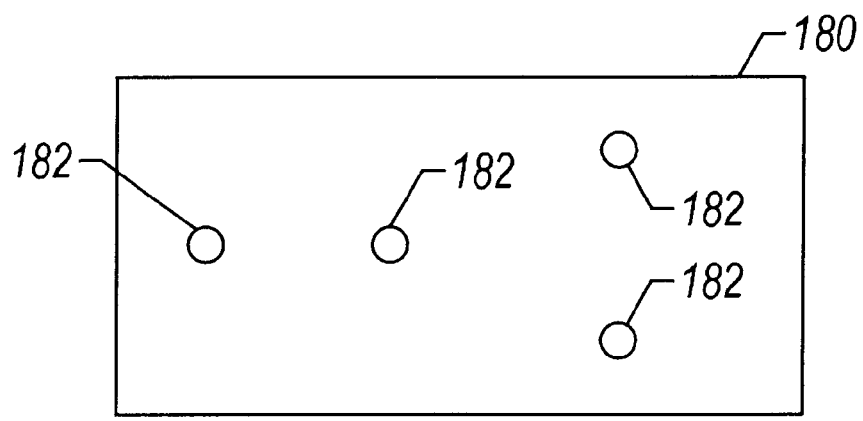
FIG. 10 is a sample connector plate for connected butted frame beams.

Referring to FIG. 8, a cross-section of a beam such as beam 151 is shown and it will be understood by those skilled in the art that this cross-section configuration is representative also of beams 153, 156, and 158. Further, the specific configuration of the cross-section can vary depending upon the procured stock used to fabricate the beams and such stock is readily commercially available. In the preferred embodiment, beam 151 defines two longitudinal slots 168 on either side of beam 151. Each of longitudinal slots 168 includes a trough 170 which has a larger dimension than neck opening 172 of slot 168. This configuration facilitates the retention of the head of a bolt 174 within the trough region of slot 168 with the threaded shank of bolt 174 extending outwardly from beam 151. A connector plate 180 such as the plate 180 shown in FIG. 10 includes a plurality of holes 182 therethrough wherein holes 182 are spaced in sets to correspond to the spacing of slots 168 in the frame beams. In such a manner, connector plates 180 can be utilized to fasten abutting beams in a manner similar to that shown in FIG. 9. Those skilled in the art will also recognize that connector plate 180 can assume a variety of configurations and forms such as assuming configurations as an angled plate or different hole spacings to achieve different objectives in configuring load-carrying frame 22. Where, as in the beams disclosed herein, the beams have slots extending their entire length the individual beams are infinitely adjustable one with respect to another to create an infinite variety of configurations of load-carrying frame 22 to fit the particular needs of the user.

Figure 9:
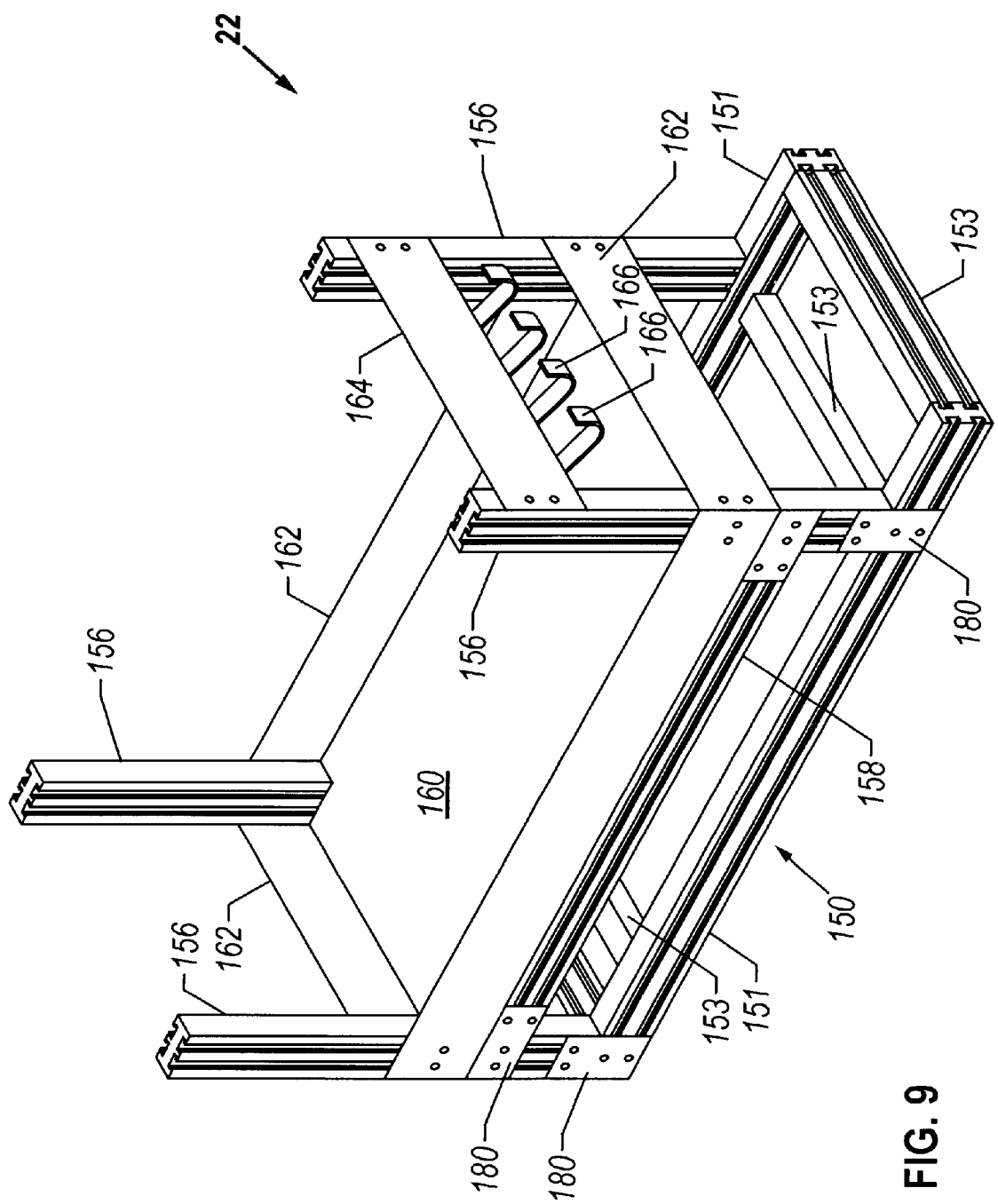
FIG. 9 is a sample configuration of a load-carrying frame incorporating a shelf, side protectors, and a hook panel.

Turning now to FIG. 9, a representative load-carrying frame 22 of modular cart 20 is shown with the wheeled carriage removed for clarity. Load-carrying frame 22 has a lower base frame 150 which is generally comprised of a rectangular configuration of longitudinal beams 151 and lateral beams 153. Each carriage mounting plate 66 is typically mounted to a suitably spaced pair of lateral beams 153 at both a front end and a rear end of base frame 150. A plurality of vertical beams 156 can be supported on and affixed to base frame 150 in a manner described below in any desired configuration to form one or a plurality of storage areas within load-bearing frame 22. Secondary longitudinal beams 158 can extend between adjacent vertical beams 156 at one or a plurality of elevations above base frame 150 to create differing levels within frame 52. A shelf platform 160 is supported by secondary longitudinal beams 158 to provide support for items stored upon shelf platform 160. Side protectors 162 are affixed to vertical beams 156 and act to prevent items stored on shelf platform 160 from either falling off during transit or from obstacles in close proximity to modular cart 20. Other accessories such as hook panel 164 and also extend between adjacent vertical beams 156 and have protruding therefrom one or more hooks 166 from which items can be hung for storage or transportation. It will be readily obvious to those skilled in the art that the number of configurations of storage areas, spacings, sizes, and specially configured accessories is virtually limitless and thus lends modular cart 20 to a wide variety of uses and configurations that are easily and readily changeable by the user in a short period of time.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A modular cart, said cart comprising:

a load carrying frame; and a wheeled carriage supporting said load carrying frame; said carriage including a front carriage assembly pivotally coupled to a front of said frame and a rear carriage assembly coupled to a rear of said frame;

said front carriage assembly further comprising an axle pivotally coupled to said load carrying frame, said axle having a first end and a second end;

said rear carriage assembly further comprising an axle coupled to said load carrying frame, said axle having a first end and a second end;

an extendable axle arm sleeved within each of said axles, and telescopingly movable with respect to each said axle end between a first retracted position and a second extended position;

a plurality of rollers on said extendable axle arms, wherein said rollers bear upon a surface of said axle when said extendable axle arm is telescopically moved with respect to said axle end; and, a wheel assembly attached to the end of each extendable axle.

2. The modular cart according to claim 1, wherein said axle of said front carriage is selectable between a first position pivotally fixed with respect to said load carrying frame and a second position freely pivotal with respect to said load carrying frame.

3. The modular cart according to claim 2 wherein said axle of said front carriage further comprises a removable pin engagable in a hole to maintain said fixed position, and disengagable to select said freely pivotal position.

4. The modular cart according to claim 1 wherein said wheel assemblies are caster wheel assemblies pivotal about a vertical end axis and selectable between a third position pivotally fixed with respect to said vertical end axis, and a fourth position freely pivotal about said vertical end axis.

5. The modular cart according to claim 1 wherein said rear carriage assembly is pivotally coupled to said rear of said load carrying frame, said front and said rear carriage assemblies being substantially identical.

6. The modular cart according to claim 5 wherein each said axle of said front and said rear carriage assembly is selectable between a first position pivotally fixed position with respect to said load carrying frame, and a second position freely pivotal with respect to said load carrying frame.

7. The modular cart according to claim 5 further comprising:

a stabilizer bar extending between said front and said rear carriage assemblies;

a first end of said stabilizer bar pivotally coupled to said first end of said front axle; and, a second end of said stabilizer bar pivotally coupled to said second end of said rear axle, such that when said front a said rear axles are selected to be freely pivotal, a pivoting of said front axle causes an opposite pivoting of said rear axle.

8. The modular cart according to claim 5 further comprising:

a first handle assembly coupled to one of said front or said rear carriage assemblies, said handle assembly comprising:

a handle having one end vertically pivotal with respect to said axle; and, a hitch attachment at a second end thereof for coupling to a second cart.

9. The modular cart according to claim 8 further comprising:

a second handle assembly coupled to the other said carriage assembly for coupling to a third cart.

10. The modular cart according to claim 8 wherein said handle assembly further comprises:

a jack support member movable between a first retracted position substantially parallel to said handle and a second extended position substantially perpendicular to said handle.

11. The modular cart according to claim 1 further comprising:

a reconfigurable framework supported by said frame, said reconfigurable framework defining a plurality of storage areas therein for transporting items by said modular cart.

12. A modular cart, said cart comprising:

a steerable wheeled carriage comprising at least a front and a rear axle;

said axles having a first end and a second end;

an extendable axle arm sleeved within each said end of said axles, and being telescopingly movable with respect to each said axle end between a first retracted position and a second extended position;

a plurality of rollers on said extendable axle arms, wherein said rollers bear upon a surface of said axle when said extendable axle arm is telescopically moved with respect to said axle end;

a wheel assembly attached to each said extendable axle;

a load carrying frame supported by said carriage; said load carrying frame further comprising:

a plurality of horizontally arranged beams, each said beam defining at least two horizontal slots substantially extending along a length of said beam;

a plurality of vertically arranged beams, each said beam defining at least two vertical slots substantially extending along a length of said beam;

a plurality of fasteners partially captured in said slots and further engaging connector plates to interconnect said plurality of horizontal beams and said plurality of vertical beams into a framework defining at least one storage area; said beams, said fasteners, and said connector plates adjustable along said slots to selectably create different sized storage areas optimized to a desired configuration.

13. The modular cart according to claim 12 further comprising:

a first steering mode wherein said axles are pivotal about a central vertical axle and said wheels are positionally fixed with respect to said axles; and, a second steering mode wherein said axles are positionally fixed with respect to said frame and said wheels are individually pivotal about vertical axes at ends of said axles.

14. The modular cart according to claim 13 further comprising:
   a stabilizer bar extending between said front and said rear carriage assemblies;
   a first end of said stabilizer bar pivotally coupled to said first end of said front axle; and,
   a second end of said stabilizer bar pivotally coupled to said second end of said rear axle, such that when said front and said rear axles are selected to be freely pivotal, a pivoting of said front axle causes an opposite pivoting of said rear axle.

15. The modular cart according to claim 14 further comprising:
   a first handle assembly coupled to one of said front or said rear axles, said handle assembly further comprising:
      a handle having one end vertically pivotal with respect to said axle; and,
      a hitch attachment at a second end thereof for coupling to a second cart.

16. The modular cart according to claim 15 further comprising:
   a second handle assembly coupled to the other said carriage assembly for coupling to a third cart.

17. The modular cart according to claim 15 wherein said handle assembly further comprises:
   a jack support member movable between a first retracted position substantially parallel to said handle and an extended position substantially perpendicular to said handle.

* * * * *

UNITED STATES PATENT AND TRADEMARK OFFICE
CERTIFICATE OF CORRECTION

PATENT NO.    : 6,425,591 B1
DATED         : July 30, 2002
INVENTOR(S)   : Richard Ball It is certified that error appears in the above-identified patent and that said Letters Patent is hereby corrected as shown below:

Column 2,
Lines 2 and 14, delete "defming" and insert therefor -- defining --.

Column 3,
Line 30, please delete "anddefines" and insert therefor -- and defines --.
Line 38, please delete "44defines" and insert therefor -- 44 defines --.
Line 48, please delete "anddefines" and insert therefor -- and defines --.

Column 4,
Line 8, please delete "furtherdefines" and insert therefor -- further defines --.
Line 67, please delete "tonguel 10" and insert therefor -- tongue 110 --.

Column 5,
Line 7, please delete "tongue 10" and insert therefor -- tongue 110 --.
Line 12, please delete "Handel" and insert therefor -- Handle --.

Signed and Sealed this

First Day of April, 2003

JAMES E. ROGAN
*Director of the United States Patent and Trademark Office*